United States Patent [19]
Poole, Jr.

[11] Patent Number: 5,788,192
[45] Date of Patent: Aug. 4, 1998

[54] PORTABLE SPLICING RACK AND APPARATUS TO SECURE A BRACKET

[76] Inventor: Roy L. Poole, Jr., 219 Roy Poole Rd., Commerce, Ga. 30529

[21] Appl. No.: 571,539

[22] Filed: Dec. 13, 1995

[51] Int. Cl.[6] .............................. F16L 3/00; A47B 96/06; A47B 57/00
[52] U.S. Cl. .................... 248/49; 248/243; 248/221.11; 248/222.11; 211/192; 211/193; 292/175; 108/146
[58] Field of Search ................ 248/49, 166, 188.6, 248/243, 221.11, 222.11; 211/192, 193, 195, 190, 208; 403/325, 322, 321; 108/146, 154; 292/106, 175

[56] References Cited

U.S. PATENT DOCUMENTS

| | | | |
|---|---|---|---|
| 70,149 | 10/1867 | Atkinson | 292/175 |
| 177,426 | 5/1876 | Rodigrass | 292/175 X |
| 629,446 | 7/1899 | James | 292/175 X |
| 669,365 | 5/1901 | Lutts | 292/175 X |
| 836,313 | 11/1906 | Fox | 292/175 X |
| 1,304,334 | 5/1919 | Long | 292/175 |
| 1,657,939 | 1/1928 | Rockwell | |
| 1,775,391 | 9/1930 | Fassinger | 248/243 X |
| 1,830,438 | 11/1931 | Miller | |
| 2,472,654 | 6/1949 | Engelke | |
| 3,043,440 | 7/1962 | Berlin | 108/146 |
| 3,568,455 | 3/1971 | McLaughlin et al. | |
| 3,601,432 | 8/1971 | Fenwick et al. | 211/190 X |
| 3,680,711 | 8/1972 | Brucker | 211/192 X |
| 3,697,034 | 10/1972 | Shell | 211/192 X |
| 3,885,846 | 5/1975 | Chuang et al. | 108/146 X |
| 3,895,496 | 7/1975 | Perrott et al. | |
| 4,042,200 | 8/1977 | Overall | |
| 4,092,019 | 5/1978 | Young | 269/296 |
| 4,387,872 | 6/1983 | Hogue | 248/221.11 |
| 4,406,374 | 9/1983 | Yedor | 211/192 |
| 5,022,621 | 6/1991 | Quest | |
| 5,092,546 | 3/1992 | Wolfbauer | 248/49 |
| 5,103,554 | 4/1992 | Homefeld | 29/753 |
| 5,290,127 | 3/1994 | Foster et al. | 248/49 X |
| 5,437,424 | 8/1995 | Netz, Sr. | 248/49 |
| 5,538,213 | 7/1996 | Brown | 248/222.11 |

FOREIGN PATENT DOCUMENTS

| | | | |
|---|---|---|---|
| 790476 | 7/1968 | Canada | 292/175 |
| 2262727 | 10/1975 | France | 292/175 |
| 2742-986 | 3/1978 | Germany | 211/193 |

Primary Examiner—Robert W. Gibson, Jr.
Assistant Examiner—Stephen S. Wentsler
Attorney, Agent, or Firm—Hinkle & Associates, P.C.

[57] ABSTRACT

A cable splicing rack has a base 1, arms 13a and 13b having slots 16, removable brackets 20 and caps 48. Four side frame members 6 pivotally connected together at their extremities with a through bolt 11 and nut 12 assembly compose the base 1. The base 1 is adaptable to the contour of the terrain. The arms 13a and 13b are pivotally connected to the base 1 so that they may be folded toward each other and become parallel to each other within a perimeter 19 of the base 1. The caps 48 are removably placeable on the arms 13a and 13b for the safety of a lineman and to prevent damage to a cable 49 undergoing splicing operations. The brackets 20 are provided with a latch 28 to secure the brackets 20 to the arms 13a and 13b. The latch 28 has a housing 29 mounted to the bracket 20, a latchkey 36 adjacent to one side of the housing 29, a latch 41 slidably engaging a channel 30 of the housing 29, a spiral spring 45 between the housing 29 and the latch 41 to bias the latchkey 36 toward the housing 29 so that the latch 41 engages the slots of the arms 13a and 13b.

12 Claims, 2 Drawing Sheets

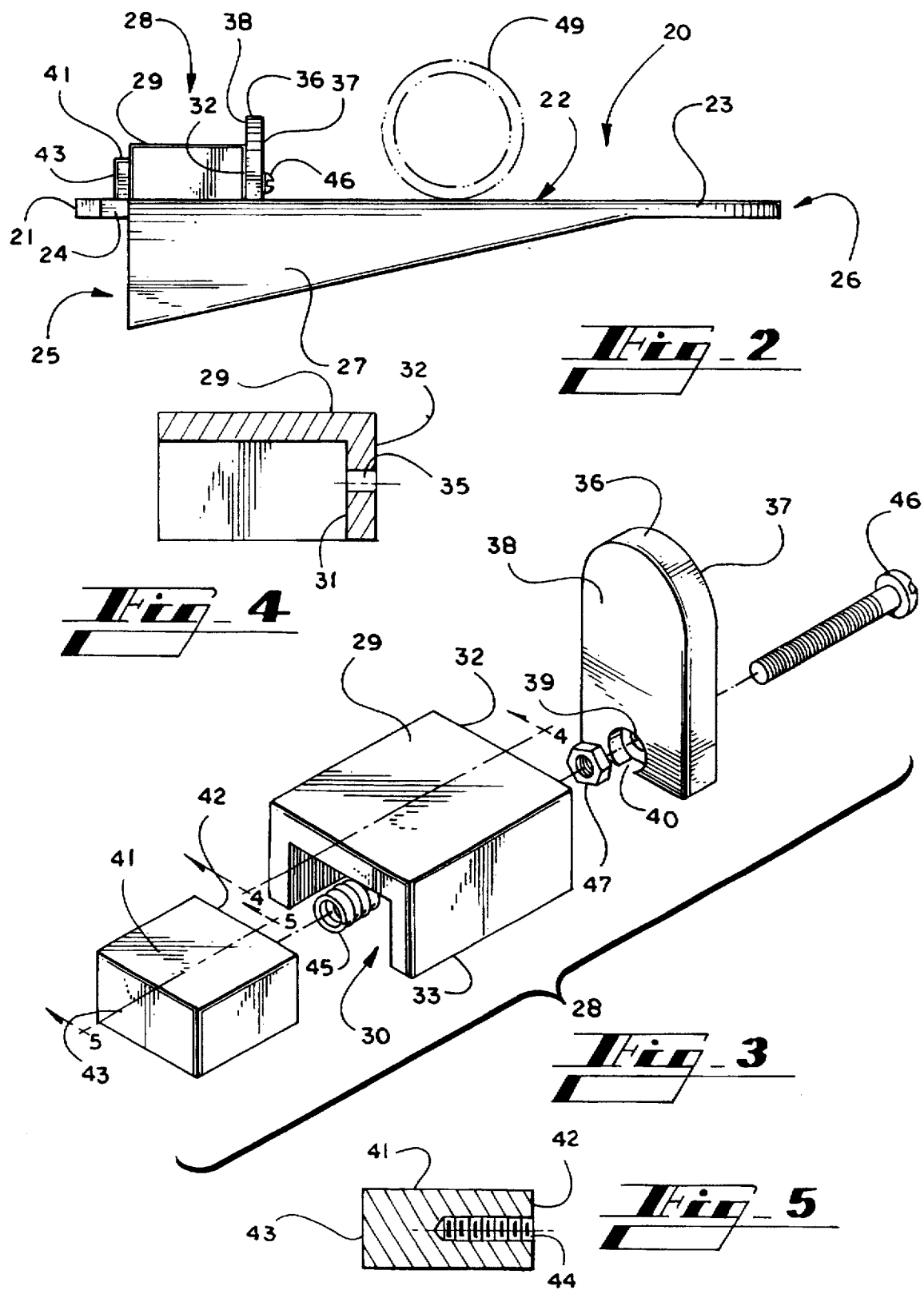

5,788,192

1

PORTABLE SPLICING RACK AND APPARATUS TO SECURE A BRACKET

BACKGROUND OF THE INVENTION

1. Field of the Invention

The present invention relates generally to the field of cable support systems used to splice cable. More particularly, the present invention relates both to a heavy-duty cable splicing rack that is light-weight, portable and adaptable to most terrain and to a removable bracket which is fitted with a latching means to secure the bracket to the rack.

2. Description of the Prior Art

In the industries utilizing cable systems for the transmission of signals or electrical power, such as telephone, television and electrical, it is often necessary to splice the cables in the field under less than desirable conditions. Particularly troublesome are the conditions created in the field when repairing underground cables, especially buried cables. Rarely does the trench or hole in which the lineman must work have a level floor, rendering the splicing operation awkward. Further complicating the repair problem, many companies, including natural gas, petroleum, chemical, telephone, television and electrical, utilize the a common right-of-way to bury their cables, conduits and pipelines. Therefore, driving a post into the ground to support the cable is unsafe. It is imperative that the conductors within the cables, once exposed, remain off the ground and unsoiled. Thus, it is important that the brackets supporting the cable remain firmly engaged to the rack.

Various forms of support members for holding cables, pipes and other similar items during the repair process have been devised, but have been less than satisfactory for field conditions. Some forms are designed with ground engaging portions that require a flat surface to remain stable. Other forms are devices for holding cables and pipes, but utilize ground engaging stakes. Further, some forms have support structures without ground engaging features. Still further, others are designed with brackets that do not have a means to prevent the bracket from dislodging from the support member.

A tile support described in U.S. Pat. No. 3,568,455 by McLaughlin et al has a ground engaging stake with a bracket plate having a flexible cable from which to suspend a pipeline.

U.S. Pat. No. 1,657,939 granted to Rockwell described an upright channel bar having a succession of T-shaped slots to receive a removable bracket having lugs therein. The channel bar is designed to be attached to a wall or other structure. The bracket does not have a means to prevent it from dislodging from the channel bar and does not show a portable base.

A cable rack assembly described in U.S. Pat. No. 1,775,391 by Fassinger has an upright channel iron provided with a series of modified T-shaped slots to receive a removable bracket. The device does not describe a base, nor does it have a means to prevent the bracket from dislodging from the channel iron.

U.S. Pat. No. 1,830,438 granted to Miller described a supporting bracket having a T-shaped cross section provided with a series of horizontally arrayed notches to receive a removable supporting arm therein. This device also does not describe a base, nor does it have a means to prevent the supporting arm from dislodging from the supporting bracket iron.

2

A cable splicing holder which is placed upon the ground and has certain pockets for receiving cable at each end is described in U.S. Pat. No. 4,092,019 by Young. The cable supports are not brackets and the holder does not have a ground engaging portion suitable for uneven terrain.

SUMMARY OF THE INVENTION

The present invention pertains to a portable cable splicing rack and a latching means which has, as general objectives, the following:

Has a base readily adaptable to uneven surfaces or terrain;

Has a heavy-duty, yet light-weight, construction providing ease of portability;

Needs only a single individual using a wrench for quick and simple set-up to provide a sturdy splicing rack;

Requires relatively little space for storage or transport;

Has a removable bracket that can be secured to the rack to prevent accidental disengagement of the bracket;

Enhances safety by eliminating the need of driving a post into the ground; and

Provides a safety cap over the upper end of the arm to prevent accidental injury to either an individual or a cable.

This invention accomplishes the above and other objectives by providing a portable cable splicing rack having foldable arms which may be extended to an upright position to which one or more cable supporting brackets may be secured. The cable splicing rack has a base, a pair of slotted arms, removable brackets for each arm and caps for each arm. Four side frame members pivotally connected together at their extremities with a through bolt and nut assembly comprise the base. Each bolt is mounted to the frame members so that the nut may be adjusted to apply pressure which prevents the frame members from pivoting and forms a base adapted to the contour of the terrain. Each arm is pivotally connected to the base at a lower end of the arm so that the arms may be folded toward each other and become parallel to each other within a perimeter of the base. Each arm has an array of T-shaped slots to receive the removable bracket. The bracket has a support portion and a head. The head has a T-shape to engage a respective T-shaped slot of the arm. A cap is removably placeable on a upper end of the arm for the safety of a lineman and to prevent the upper end of the arm from damaging a cable undergoing splicing operations. The side frame members, the arms, and the brackets are constructed from steel. The caps are constructed of durable plastic.

The brackets may be provided with a latching means to secure the respective bracket to the arm. The latching means has a housing mounted to the bracket, a latchkey adjacent to one side of the housing, a latch having a threaded cylindrical socket adjacent to the other side and slidably engaging a channel of the housing, a spiral spring between the housing and the latch to bias the latchkey toward the housing and a screw inserted through the latchkey, the housing and the spring to adjustably engage the threads of the cylindrical socket of the latch. The mounting means is constructed from any suitable material.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 2 is a side elevation view of a removable bracket with a latching means;

FIG. 3 is a perspective view of the components of the latching means,

FIG. 4 is a cross-sectional, side elevation view of a housing taken along Line 4—4 of FIG. 3; and FIG. 5 is a cross-sectional, side elevation view of a latch taken along Line 5—5 of FIG. 3.

DESCRIPTION OF THE PREFERRED EMBODIMENT

Figure 1:
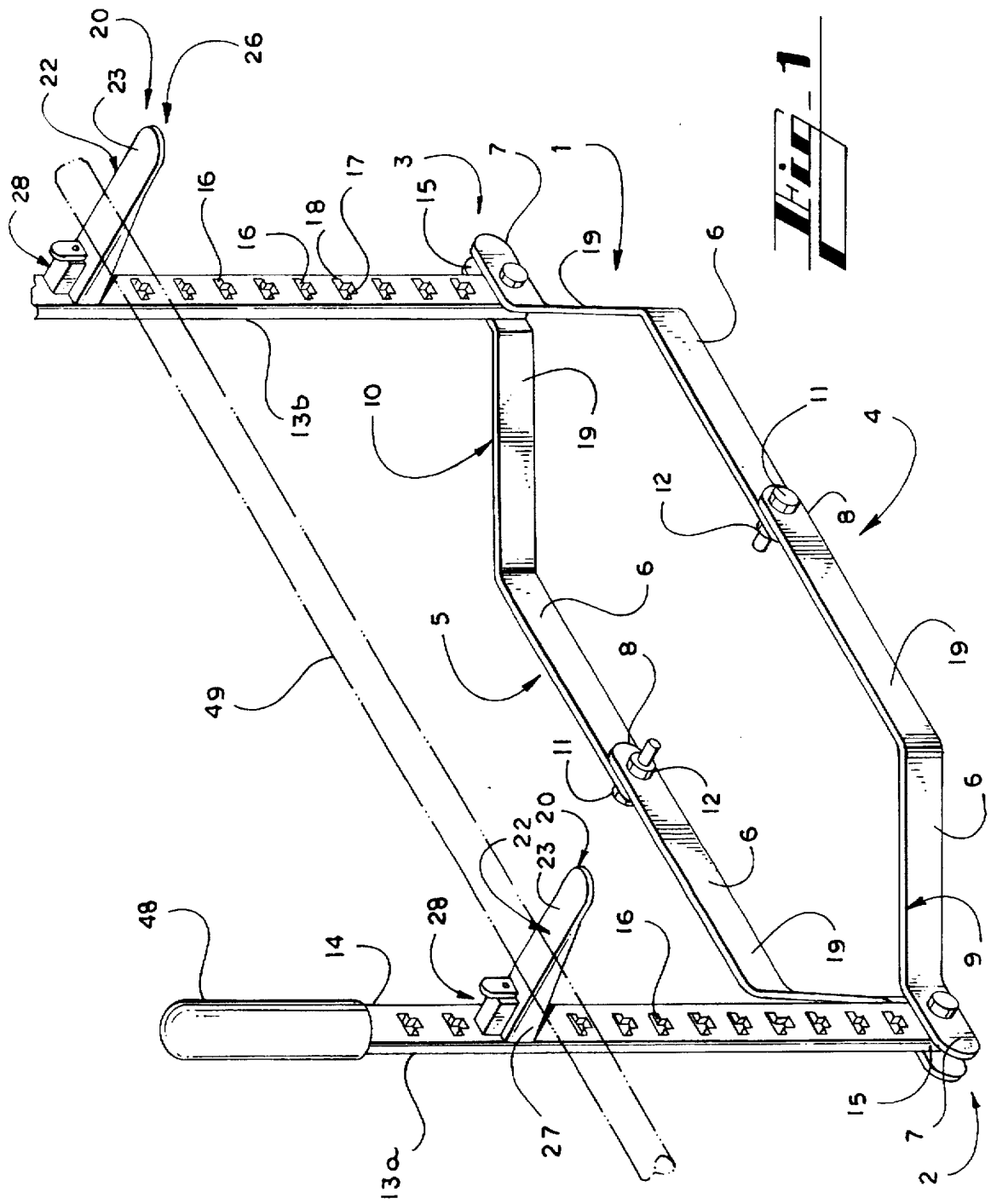
FIG. 1 is a perspective view of a portable splicing rack with a removable bracket having a latching means.

Referring to the drawings wherein like reference numerals designate corresponding parts throughout the several figures, reference is made first to FIG. 1. A portable cable splicing rack has a base 1 with a first end 2, a second end 3, a first side 4 and a second side 5. Preferably, the base 1 is constructed of steel to provide strength, durability and weight for stability.

In the preferred embodiment, the base 1 is adjustable so that it can provide a stable foundation for the cable splicing rack in uneven terrain. The base 1 has four interconnected side frame members 6. Each side frame member 6 has a distal end 7 and a proximal end 8. The distal ends 7 of two of the side frame members 6 are pivotally connected at the first end 2 of the base 1 to form a first half-section 9. The other two side frame members are pivotally connected at the second end 3 of the base to form a second half-section 10. To complete the base 1, the two half-sections 9 and 10 are connected. The first side 4 proximal end 8 of the side frame member 6 of the first half-section 9 is pivotally connected to the first side 4 proximal end 8 of the side frame member 6 of the second half-section 10. The second side 5 proximal end 8 of the side frame member 6 of the first half-section 9 is pivotally connected to the second side 5 proximal end 8 of the side frame member 6 of the second half-section 10.

All connections on the base 1 in the preferred embodiment are accomplished by use of a through bolt 11 and nut 12 assembly. Although not required for successful operation of the base 1, the bolt 11 is mounted to the side frame member 6. By mounting the bolt 11, a lineman can adjust the tension on the nut 12 using only a single wrench. Preferably, the bolt 11 is welded to the side frame member 6. In operation, the base 1 may be adjusted by the lineman to the contour of the terrain on which it is placed. The lineman then tightens each nut 12 which in turn secures the connections from pivotal rotation and provides a stable base 1.

The cable splicing rack is next comprised of a first arm 13a and a second arm 13b. The arms 13a and 13b have an upper end 14, a lower end 15 and an array of T-shaped slots 16. There must be at least one T-shaped slot 16 in each arm 13a and 13b. The T-shaped slots 16 each have a narrow vertically extending lower portion 17 and a transverse upper portion 18. The lower ends 15 of the arms 13a and 13b are pivotally connected between the distal ends 7 of the side frame members 6. In the preferred embodiment, the first arm 13b is pivotally connected to the base 1 at the lower end 15 between the distal ends 7 of the side frame members 6 of the first half-section 9. Likewise, the second arm 13b is pivotally connected to the base 1 at the lower end 15 between the distal ends 7 of the side frame members 6 of the second half-section 10. After placing the base 1 in the desired location to conduct splicing operations, the lineman can raise either or both arms 13a and 13b into a vertical position and tighten the nut 12 at the distal ends 7 of the half-sections 9 and 10 to secure the connection from pivotal rotation locking either or both arms 13a and 13b in place. To reduce space requirements for transport or storage, arms 13a and 13b can be conveniently folded toward each other and become parallel to each other within a perimeter 19 of the base 1. In the preferred embodiment, the arms 13a and 13b are constructed from steel. Another embodiment of the present invention can be constructed having only arm 13a. Also, another embodiment of the present invention can be constructed having more arms than 13a and 13b.

To provide a platform for the lineman to conduct splicing operations, FIG. 2 shows a bracket 20 removably placeable within the slots 16 of the arms 13a and 13b. The bracket 20 consists of a T-shaped head 21 and a support portion 22 having a support surface 23. The head 21 has a width that is sufficient to permit its passage into the upper portion 18 of any of the T-shaped slots 16 and is connected to the support portion 22 by a neck 24 having a width sufficient to permit its passage into the lower portion 17 of any of the T-shaped slots 16. The neck 24 is slightly longer than a thickness of the arms 13a and 13b. The support portion 22 has an arm side 25 and a support side 26. Extending from the support surface 23 are depending support walls 27 decreasing in depth from the arm side 25 to the support side 26. The support walls 27 act as a cantilever support for the bracket 20.

As shown in FIGS. 1 through 5, the bracket 20 has a latching means 28 on the support surface 23 at the arm side 25 for securing the bracket 20 in the slots 16 of the arms 13a and 13b. The latching means 28 first comprises a housing 29 having a channel 30, an inner face 31, an outer face 32 and a bottom side 33. In the preferred embodiment, the housing 29 is mounted to the support surface 23. The housing 29 can be mounted by use of adhesives, welding and, preferably, mounting screws (not shown) through the bracket into the bottom side 33. The outer face 32 has a first hole 35. Next, the latching means has a latchkey 36. The latchkey 36 has a cable side 37, a housing side 38 and a second hole 39. The housing side 38 of the latchkey 36 is adjacent to the outer face 32 of the housing 29. The housing side 38 has a recess 40 concentric with the second hole 39. A latch 41 slidably engages the channel 30 of the housing 29. The latch 41 has an inner surface 42 and an outer surface 43. The inner surface 42 has a threaded cylindrical socket 44. Preferably, the latch 41 is a rectangular member designed to be slightly smaller than the transverse upper portion 18 of the T-shaped slot 16 of the arms 13a and 13b. A spring 45 is used to bias the housing side 38 of the latchkey 36 toward the outer face 32 of the housing 29. In the preferred embodiment, the spring 45 is a spiral spring placed within the housing 29. One end of the spring 45 engages the inner face 31 of the housing 29 and the other end pushes against the inner surface 42 of the latch 41. Next, a screw 46 passes through the second hole 39 of the latchkey 36, the first hole 35 of the housing 31 and the spiral spring 45, and adjustably engages the threads of the cylindrical socket 44. A locking nut 47 is placed in the recess 40 of the latchkey 36 on the screw 46. As the screw 46 is adjusted into the cylindrical socket 44 of the latch 41, the locking nut 47 exerts pressure against the housing side 38 of the latchkey 36 and tightens the screw 46 against the cable side 37 of the latchkey 36, whereby as the latchkey 36 moves toward the outer face 32 of the housing 29, the outer surface 43 of the latch 41 moves through the slot 16 of the arms 13a and 13b securing the bracket 20. Because the latch 41 is sized to be slightly smaller than the transverse upper portion 18 of the T-shaped slot 16, the neck 24 of the bracket 20 can not be raised to disengage the lower portion 17 of the slot 16.

In the preferred embodiment,the latching means is constructed from aluminum. Further, the first hole 35, the second hole 39, the recess 40 and the threaded cylindrical socket 44 are aligned along a concentric axis with one other. The first hole 35 and the second hole 39 each have a diameter sufficient to permit passage of the screw 46 through them.

Referring again to FIG. 1, a cap 48 is removably placeable on the upper ends 14 of the arms 13a and 13b for the safety of the lineman. Also, the cap 48 prevents accidental damage to a cable 49 being placed on the support surface 23 of the bracket 20 to undergo splicing operations.

It is foreseeable that the base 1 can be constructed from other materials, including and not limited to iron, aluminum and other metals, plastics, fiberglass, and any other durable material. Although some of these materials may be light weight in comparison to steel, weight may be added to the base in the form of sandbags, heavy blocks, concrete and the like. It is also foreseeable that the base 1 may be cast as a single, two or multiple member construction. Still, it is foreseeable that the base 1 connections can comprise another form of connector or be placed at another location of the base 1 which provides pivotal rotation for the arms 13a and 13b so they are folded within the perimeter 19 of the base 1. Yet still, it is foreseeable that the latching means 28, the bracket 20 and the arm 13a and 13b can be constructed from the same materials as the base. All of these embodiments derived from the preferred embodiment are a part of this invention.

The latching means 28 is designed to be effective with any form of a removable bracket that inserts into a slot or a notch. As long as a bracket receiving arm has a latch receiving slot, the latch 41 can secure the removable bracket to the bracket receiving arm to prevent accidental disengagement.

Various modifications may be made of the invention without departing from the scope thereof and it is desired, therefore, that only such limitations shall be placed thereon as are imposed by the prior art and which are set forth in the appended claims.

What is claimed is:

1. A portable cable splicing rack, comprising:
   a base having a first end, a second end, a first side, a second side and four side frame members, each side frame member having a distal end and a proximal end, the distal ends of two of the side frame members being pivotally connected at the first end of the base to form a first half-section, the other two side frame members being pivotally connected at the second end of the base to form a second half-section, the first side proximal ends of the side frame members of the first half-section being pivotally connected to the first side proximal ends of the side frame members of the second half-section, the second side proximal ends of the side frame members of the first half-section being pivotally connected to the second side proximal ends of the side frame members of the second half-section,
   at least one arm having a lower end and at least one slot, the lower end of the arm being pivotally connected between the distal ends of the side frame members of one of the half-sections, and
   at least one bracket having an arm side and a support surface, the bracket being removably placeable within the slot of the arm.

2. A portable cable splicing rack according to claim 1, wherein the bracket further comprises a latching means for securing the bracket to the arm, the latching means is on the support surface and at the arm side.

3. A portable cable splicing rack according to claim 2, wherein the latching means comprises:
   a housing the housing having a channel, an inner face and an outer face, the outer face having a first hole,
   a latchkey having a cable side, a housing side and a second hole, the housing side of the latchkey being adjacent to the outer face of the housing,
   a latch slidably engaging the channel of the housing, the latch having an inner surface and an outer surface, the inner surface having a threaded cylindrical socket, and
   a screw inserted through the second hole of the latchkey and the first hole of the housing, the screw adjustably engaging the threads of the cylindrical socket, whereby as the latchkey moves toward the outer face of the housing, the outer surface of the latch moves through the slot of the arm and secures the bracket in the slot of the arm.

4. A portable cable splicing rack according to claim 3, wherein the housing is mounted to the bracket and further comprises a spring engaging the latch to bias the housing side of the latchkey toward the outer face of the housing.

5. A portable cable splicing rack according to claim 4, wherein the spring is a spiral spring placed on the screw, one end of the spring engages the inner face of the housing and the other end of the spring pushes against the inner surface of the latch, whereby the housing side of the latchkey is biased toward the outer face of the housing.

6. A portable cable splicing rack according to claim 3, wherein the latchkey has a recess concentric with the second hole on the housing side and further comprises a locking nut placed in the recess on the screw, whereby the locking nut exerts pressure against the housing side of the latchkey as the screw is adjusted into the cylindrical socket of the latch causing the screw to tighten against the cable side of the latchkey.

7. A portable cable splicing rack according to claim 1, wherein the arm has an upper end and further comprises a cap removably placeable over the upper end of the arm.

8. A portable cable splicing rack, comprising:
   a base,
   at least one arm having at least one slot and a lower end, the arm being pivotally connected at the lower end to the base,
   a bracket being removably placeable within the slot of the arm,
   the base being adjustable and having a first end, a second end, a first side, a second side and four side frame members,
   each side frame member has a distal end and a proximal end, the distal ends of two of the side frame members are pivotally connected at the first end of the base to form a first half-section, the other two side frame members are pivotally connected at the second end of the base to form a second half-section,
   the first side proximal end of the side frame member of the first half-section is pivotally connected to the first side proximal end of the side frame member of the second half-section, and
   the second side proximal end of the side frame member of the first half-section being pivotally connected to the second side proximal end of the side frame member of the second half-section.

9. A portable cable splicing rack, comprising:
   an adjustable base having four articulated side frame members, at least one arm having at least one slot and a lower end, the arm being pivotally connected at the lower end to the base, a bracket being removably placeable within the slot of the arm, the bracket having a support surface and an arm side and further comprising a latching means for securing the bracket to the arm, the latching means is at the arm side and on the support surface, the latching means further comprising a housing having a channel, an inner face and an outer face, the housing being mounted to the bracket, the outer face having a first hole, a latchkey having a cable side, a housing side and a second hole, the housing side of the latchkey being adjacent to the outer face of the housing, a latch slidably engaging the channel of the housing, the latch having an inner surface and an outer surface, the inner surface having a threaded cylindrical socket, and a screw inserted through the second hole of the latchkey and the first hole of the housing, the screw adjustably engaging the threads of the cylindrical socket, whereby as the latchkey moves toward the outer face of the housing, the outer surface of the latch moves through the slot of the arm and secures the bracket in the slot of the arm.

10. A portable cable splicing rack according to claim 9, further comprising a spring engaging the latch for biasing the housing side of the latchkey toward the outer face of the housing.

11. A portable cable splicing rack according to claim 10, wherein the spring is a spiral spring placed on the screw, one end of the spring engages the inner face of the housing and the other end of the spring pushes against the inner surface of the latch, whereby the housing side of the latchkey is biased toward the outer face of the housing.

12. A portable cable splicing rack according to claim 9, wherein the latchkey has a recess concentric with the second hole on the housing side and further comprises a locking nut placed in the recess on the screw, whereby the locking nut exerts pressure against the housing side of the latchkey as the screw is adjusted into the cylindrical socket of the latch causing the screw to tighten against the cable side of the latchkey.

* * * * *